United States Patent Office 3,219,542
Patented Nov. 23, 1965

3,219,542
PROCESS FOR PRODUCING PHYTOSTEROL
MATERIAL FROM CUCURBITACEAE
Gerald J. Lammers, Garden City, N.Y., assignor to
Chemetron Corporation, Chicago, Ill., a corporation of
Delaware
No Drawing. Filed July 19, 1961, Ser. No. 125,075
13 Claims. (Cl. 195—1)

This invention relates to pharmaceutical compositions for improving fluid clearance by restoration of kidney function so that a normal amount of solid wastes and fluids are excreted.

The novel composition of the invention can be derived from the family of botanical substances known as "Cucurbitaceae" or gourds. Cucurbita can be used. The greatest yield is obtained from the more primitive types of gourds and Cucurbita citrul primitive is preferred. This gourd has no known commercial use or value. While the primitive gourds are preferred, the commercially available pumpkin, squash, cucumber or watermelon can be used. The later growths, by which is meant the second or subsequent growths of gourds, give greater yields than do the first growths, and this is true for both the primitive and the commercial gourds.

A principal object of the invention is to provide the active ingredient of the gourd in a suitable form and composition, so that its medicinal value can be utilized to practical advantage.

There are two principal features of the process of the invention, one relating to the form of the gourd, and one relating to the manner of treating the plant material. As to the form of the material, according to the invention, substantial improvement is realized by using a later growth gourd. Following removal of a ripe gourd from its vine, if the plant remains in its normal environment, a second growth gourd will displace the position formerly occupied by the first growth gourd (which, in the case of commercial gourds, is the melon of commerce). The second growth gourd has a green skin, its pulp or flesh is white or of a brown shade, and it may have no seeds or it may have seeds of different colors, such as black, brown, and white. Relative to the first growth gourd, the later growth gourd is low in carbohydrates including sugars, and provides a higher concentration of the active ingredient. As noted above, increased yields of the active ingredient are realized by using the later growth gourd. Further, use of the later growth gourd results in a product having advantages over that obtained by using the first growth gourd. Thus, for the later growth gourd, the sugar concentration in the product is less, and the bacterial count is lower, probably as a consequence of lower carbohydrate content. Lower bacterial count is desirable in that improved flavor is an incident to the lower count. Also, as will more fully be discussed below, a preferred form of the product is as a crystalline material, and the crystalline product made from the later growth gourds is less hygroscopic. This is significant since the hygroscopicity of the product is excessive to the point of requiring special care in packaging.

So far as is known to me, later growth gourds have not been used commercially prior to my invention. Thus, the invention provides for utilization of this plant material.

The feature of the process having to do with the manner of treating the plant material, involves contacting the fruit with a solvent for the active ingredient to extract such ingredient, thereafter separating the solvent from the fruit and removing at least part of the solvent to provide a concentrate of the active ingredient. The preferred solvent is ethyl alcohol. Other suitable solvents are ethyl oxide, chloroform, ether, petroleum ether, and methyl alcohol. The solvent must be non-toxic, or removed to an extent such that the concentrate is non-toxic.

In a preferred embodiment, the treatment involves maintaining the picked fruit, for example picked later growth gourds, preferably the second growth, at fermentation conditions for a time sufficient for formation in the fruit by fermentation of ethyl alcohol, in an amount sufficient for dissolution of the active ingredient in the resulting aqueous alcoholic solution formed in the gourd, comminuting the gourd, and separating from the comminuted, fermented mass an alcoholic liquid containing the active ingredient dissolved therein. This is an autofermentation. In a preferred embodiment, the whole picked fruit is maintained at the fermentation conditions and is comminuted after the fermentation. In this preferred embodiment, it is important that the gourd be free of bruises.

To provide the product in market form the aqueous alcoholic solution of the active ingredient can be worked to a concentrated composition for maintenance at below freezing temperature. In such form, the product has the physical appearance and make up of the frozen fruit juices of commerce. Alternatively, and preferably, it can be worked up to provide the product in crystalline form.

To provide the frozen concentrate, the aqueous alcoholic solution is concentrated by evaporating some of its water to produce a concentrate which has about 25–50%, preferably 33% to 40% of solids by weight. This concentrate is stable when frozen at minus 29° C., to minus 40° C. and this frozen concentrate can be packed and sold and used like frozen orange juice and similar frozen liquid products.

For providing the production in crystalline form, the aqueous alcoholic solution can be concentrated by evaporation and the resulting concentrate can be subjected to vacuum drying to obtain the crystals.

In a preferred embodiment of the invention, a sodium ion exchange salt is included in the product. This salt performs the function of favorably effecting the sodium ion level in the human or animal using the product, probably by exchange of the cation of the salt or sodium ion present in the body. Potassium chloride is a preferred sodium ion exchange salt. Other pharmaceutically acceptable salts can be used. Thus, lithium chloride and potassium bromide, etc., can be used. The sodium ion exchange salt can be added to the aqueous alcoholic solution of the extract, preferably after removal of solids therefrom and before concentration is begun. The amount of salt added can be about 0.01–0.07, preferably 0.02–0.05, or 0.03 wt. percent of potassium chloride (or corresponding weight of other salt) based on the weight of the filtered aqueous alcoholic solution, on the basis that the alcohol is produced by autofermentation. While amounts outside the ranges mentioned can be used, and while the amounts suitable will depend on the frequency of administration, the amounts set forth are generally applicable. Suitable concentrations can readily be determined by those skilled in the art.

The composition of the invention is the product as an aqueous slurry (which is normally maintained in frozen condition) or crystalline powder, each containing the sodium ion exchange salt.

The active ingredient of the gourd is insoluble or substantially insoluble in water. The active ingredient is a phytosterol material which material is suitable for administration to animals and has the effect on animals of increasing their fluid clearance.

The active ingredient may be present in the gourd as such or it may be a product of the fermentation.

The residue of the later growth gourd, in the form of an aqueous mash or pulp, which is obtained by separation of the alcoholic aqueous solution from the fermented mass, can be mixed with an edible and dehydrating calcium compound, such as calcium hydroxide, to provide a fine powder which is a valuable cattle feed.

EXAMPLE

The invention is further described in the following detailed example of an embodiment of the method.

*Conversion step*

The starting material is the whole, ripe second growth *Cucurbita citrullus* primitive which grows in the southern United States, particularly in Florida. It is immediately processed after it is removed from the vine. The fresh, ripe whole second growth gourd has a small amount of sugar or other carbohydrates therein. The skin or rind of the ripe, second growth gourd should be free from cuts or holes. Said gourd should be free from rot and from rot-producing micro-organisms.

The whole, ripe and fresh second growth gourd is kept at substantially 32° C.–43° C., during a fermentation period of substantially seven to ten days.

The natural enzymes in the gourd convert some of the sugars or carbohydrates to ethyl alcohol throughout the flesh or pulp of the gourd, inwardly of the whole rind or skin.

Tests have shown that the conversion also results in the production of n-octyl alcohol $((CH_3)CH_2)_7 \cdot OH$. Said n-octyl alcohol is described in page 692 of the 1952 edition of "The Merck Index." It is well known that esters of n-octyl alcohol occur in the oils of various plants ("Chemistry of Carbon Compounds," volume 1A, pages 313–314, published in 1951 by Elsevier Publishing Company). I believe that one or more esters of n-octyl alcohol are in the seeds of the second growth gourd, and that such esters are hydrolyzed by the natural enzymes in the second growth gourd, during the conversion step.

The pulp of flesh of the gourd becomes softer. Its original color becomes brown.

A dilute mixture of ethyl alcohol and n-octyl alcohol and of the natural water of the pulp or flesh is thus formed. This mixture dissolves or takes up the active ingredient, either as a true solution, or as a colloidal dispersion or other fine suspension.

*Crushing the converted melon*

Immediately after the termination of the conversion period, the whole second growth gourd, including its seeds, are quickly ground and crushed at 20° C.–30° C. to produce an aqueous mush or pulp, which contains all or substantially all of the original water of the gourd. This mush or pulp has its solids, including the ground seeds, in fine particle form. The particle size may be about 0.03 millimeter.

*Separating the extract from the ground, converted, second growth gourd*

This is done, by filtration, immediately and quickly after the preceding step, at 20° C.–30° C.

Thus, the aqueous mush or pulp can be pressed upon a sieve or screen which has small openings, such as .002 inch.

The filtrate contains the active ingredient. The filtrate includes water, ethyl alcohol, and n-octyl alcohol. The specific gravity of the filtrate is 1.03 to 1.04, substantially equal to the specific gravity of water. This filtrate has a brown color. Its pH is usually 5.0–5.5. This pH value depends upon the batch of second growth gourds which is being processed.

In the Brix scale, the apparent density of the filtrate preferably has a maximum value 4.0° to 4.5°. A minimum propotion of sugars and carbohydrates in the filtrate is preferred, which indicates a maximum conversion of the original small percentage of sugar and carbohydrates.

As a further identification of the filtrate, its brownish color can be extracted by ethyl oxide, which extracts the ethyl alcohol and the n-octyl alcohol and esters. In one test, 10 cc. of said concentrate, which had a brown color, was mixed with 75 cc. of ethyl oxide at 20° C., and the mixture was agitated. The ethyl oxide was then separated from the concentrate. The separated concentrate finally became colorless. The separated ethyl oxide had a brownish color which had a transmission of five percent, when tested according to well-known means.

The aqueous alcoholic solution and the aqueous concentrate are unstable to micro-organisms at normal room temperature (20–30° C.), but are stable when frozen.

*Sodium ion exchange agent*

An ion exchange agent, such as potassium chloride, lithium chloride, potassium bromide, etc., is promptly dissolved in said filtrate at 20° C.–30° C. Preferably 5 grains of KCl per liter are added and the filtrate is stirred for 12 hours while maintained at room temperature.

*Concentration*

The filtrate, with its dissolved ion-exchange agent is immediately concentrated to produce an aqueous concentrate at substantially 21° C. to 23° C. under a reduced pressure of substantially 749 millimeters of mercury. This aqueous concentrate can have 33% to 40% by weight of solids.

Some of the ethyl alcohol in the filtrate is thus evaporated, and a part of the water of the filtrate is thus evaporated, thus producing a fine, concentrated suspension of the extract in the residual water. As one example, a concentrate can be produced, whose volume is one-eighth the volume of the original filtrate. The extract (i.e. active ingredient) is finely suspended or possibly dissolved in such concentrate.

If such aqeuous concentrate is made, its pH is substantially 4 to 5 and its Brix number is substantially 28 to 30. This concentrate is promptly blended by mixing it vigorously for ten hours to twelve hours, at slightly above the freezing point of water.

After said blending, the blended, aqueous concentrate can be promptly frozen in a temperature range of minus 20° F. to minus 40° F., namely, substantially minus 20° C. to minus 40° C. The concentrate may be kept frozen at this low temperature for a period of two months to three months, in order to reduce the bacterial count to about 20,000 to 30,000 per cubic centimeter. This concentrate, when thawed, may be mixed with water for internal use.

*Crystalline product*

It is preferred to dry the concentrate to crystalline powder form.

For this purpose, the concentrate can be thawed, and the thawed concentrate is reduced to substantial dryness, with less than one percent by weight of water, by heating in a vacuum under a low pressure. Alternately, the aqueous concentrate made in the last step by filtering and evaporating can be subjected directly to the crystallization treatment, the freezing merely serving to preserve the material.

Also, even if said initial concentrate is not frozen and stored in frozen condition, such initial concentrate has good coherence, so that it can be spread in thin film form upon a heated surface, for final quick dehydration at a temperature which may be a sterilizing or pasteurizing temperature, without injury to the extract. While it is preferred to make an initial aqueous concentrate which has at least 33% of solids by weight, the invention is not limited to this specific figure. The coherence of the concentrate may vary, depending upon the respective batch of second growth gourds. It is sufficient if the aqueous concentrate forms a coherent and adherent film when said concentrate is applied to a surface of stainless steel or other metal, when said film has a thickness of 1–2 millimeters. The use of such a thin film in the dehydration step is highly desirable for quick and low-cost dehydration, without injury to the extract.

In order to get a better crystalline structure, if the concentrate has a low percentage of solids by weight, such as about 33% by weight of solids, the thawed concentrate can be mixed with 3.25% by weight of caboxy methyl cellulose, prior to evaporating it to substantial dryness. Carboxy methyl cellulose, also designated as sodium carboxy methyl cellulose or "CMC," is sodium cellulose glycolate. It is described in page 876 of the 1952 edition of "The Merck Index." This "CMC" absorbs the water of the concentrate, so that the quick evaporation of the water is facilitated. If the aqueous concentrate has a high percentage of solids, such as at least 40% by weight of solids, the "CMC" my be omitted Following thawing of the concentrate, any oily layer which forms can be decanted before the crystallizing step.

By using a drying temperature above 100° C., the final crystalline powder is also sterilized.

The dehydration of the concentrate to final dry crystalline powder form may be done by means of a well known machine which is used to dehydrate fruit juices, coffee, milk, vegetable juices, etc. This machine has a moving belt made of stainless steel, on whose top run the initial concentrate, which may have 33% to 40% of solids by weight, is applied in a thin layer, whose thickness is about 1–2 millimeters. This top run is moved over a heated drum and then over a cooled drum, and a doctor blade scrapes off the final dry and cooled crystalline powder layer. This machine is well known as the vacuum dehydrator of Chain Belt Company, and is described in a booklet entitled "The Chain Belt Vacuum Dehydrator," published by Chain Belt Company, in November 1953. The heating period may be 1 to 1.5 minutes, the maximum temperature 140° C. and the time at maximum temperature, 1 second. The crystals are cooled rapidly from the maximum temperature to about 50° C. This dehydration step removes any residual ethyl alcohol and also removes the n-octyl alcohol. The crystals are extremely hard and scratch the stainless steel belt of the dryer. To obviate this difficulty, I add to the concentrate a suitable amount of Frodex brand corn syrup solids. Up to about 10% by weight of Frodex can be used.

The crystalline powder can be reduced to a suitable fine particle size, by known means, so that it can be suspended in water for use orally. The crystalline powder has a brownish color, and it is easily miscible with water, orange juice and other aqueous liquids.

The substantially dry, crystalline powder can be mixed with a suitable protective additive, such as tricalcium phosphate, starch, citric acid powder, etc. Said dry crystalline powder or mixture thereof with an additive, can be made into tablets.

Utility

The most pronounced objective effect of the active ingredient derived from the Cucurbita is increased thirst and increased urinary output, in terms of total volume and amounts of solids contained therein. Once increased urinary volume and output or clearance is established, the thirst mechanism becomes restored. These conditions will continue for varying lengths of time, after administration is discontinued. It appears, therefore, that effectiveness of the material is not due to the heavy ion phenomenon.

Dosage

Where the frozen concentrate is used, daily consumption can be 5 to 50 grams per day. Conveniently the concentrate can be diluted with water as is the practice in the case of the frozen juices of commerce.

The daily dosage of the crystalline powder can be up to 84 grams to 140 grams. It can be as low as 28 grams per day.

It can be administered orally to humans and animals.

Dosages are by no means critical since no toxic effects result from use of the material.

Treatment periods can be for 30–60 days or longer. The material can, however, be taken for an indefinite period.

While the invention has been described with reference to particular embodiments thereof, various modifications and alternatives will occur to those skilled in the art and it is desired to secure by these Letters Patent all such variations.

What is claimed is:

1. In the process of producing phytosterol material from Cucurbitaceae, the improvement which comprises contacting the fruit with an organic solvent for the phytosterol material to extract such material therefrom, said solvent being selected from the group consisting of methyl alcohol, ethyl alcohol, ethyl oxide, chloroform, ether and petroleum ether, thereafter separating the solvent from the fruit, and removing at least part of the solvent therefrom to provide a nontoxic concentrate of the phytosterol material.

2. The method of claim 1, wherein a sodium ion exchange salt is included in the phytosterol-containing liquid.

3. The method of claim 1, wherein the Cucurbitaceae plant is Cucurbita.

4. The method of claim 3, wherein the Cucurbita plant used is a later growth.

5. The method of claim 1, wherein ethyl alcohol is employed as the organic solvent.

6. In the process of producing phytosterol material from Cucurbitaceae plants, the improvement which comprises maintaining picked fruit of the plant at fermentation conditions in the temperature range of about 32–43° C. for about 7–10 days for fermentation of ethyl alcohol in the fruit by fermentation by means of natural enzymes occurring in the Cucurbitaceae plant, said ethyl alcohol being formed in an amount sufficient for dissolving phytosterol material therein, comminuting the fruit, and separating from the comminuted, fermented mass an alcoholic liquid having the phytosterol material dissolved therein.

7. The method of claim 6, wherein a sodium ion exchange salt is included in the phytosterol-containing liquid.

8. The method of claim 6, wherein after separation of the phytosterol-containing liquid, said liquid is concentrated by evaporation and the resulting concentrate is subjected to vacuum drying to provide a crystalline product containing the phytosterol material.

9. The method of claim 6, wherein a sodium ion exchange salt is included in the phytosterol-containing liquid, and after said separation of the alcoholic liquid, said liquid is concentrated by evaporation and the resulting concentrate is subjected to vacuum drying to provide a crystalline product containing the phytosterol material.

10. The method of claim 6, wherein the whole picked fruit is maintained at said fermentation conditions for the fermentation, and is comminuted after the fermentation.

11. The method of claim 6, wherein the Cucurbitaceae plant is Cucurbita.

12. The method of claim 11, wherein the Cucurbita plant used is a later growth.

13. The method of claim 6, wherein the Cucurbitaceae plant used is a later growth.

References Cited by the Examiner

UNITED STATES PATENTS

| | | | |
|---|---|---|---|
| 1,830,275 | 11/1931 | Hoye | 99—29 |
| 2,516,834 | 8/1950 | Bohm | 260—397.2 |

(Other references on following page)

UNITED STATES PATENTS

| | | | |
|---|---|---|---|
| 2,527,602 | 10/1950 | Wall | 260—397.25 |
| 2,585,954 | 2/1952 | Mattikow et al. | 260—397.2 |
| 2,712,998 | 7/1955 | Vosseler | 99—29 |

FOREIGN PATENTS

| | | |
|---|---|---|
| 488,766 | 12/1952 | Canada. |
| 753,158 | 7/1956 | Great Britain. |

OTHER REFERENCES

Prescott et al.: Industrial Microbiology, 3d ed., McGraw-Hill Book Co. Inc., New York, N.Y., 1959, pp. 341–363.

A. LOUIS MONACELL, *Primary Examiner.*

ABRAHAM H. WINKELSTEIN, *Examiner.*